Dec. 14, 1965     C. R. DAVIDSON, JR     3,223,498
HEAT TREATMENT OF CONVEYED GLASS AND APPARATUS THEREFOR
Filed Feb. 27, 1962     7 Sheets-Sheet 1

INVENTOR.
CHARLES R. DAVIDSON JR
BY
Oscar L. Spencer
ATTORNEY

Dec. 14, 1965  C. R. DAVIDSON, JR  3,223,498
HEAT TREATMENT OF CONVEYED GLASS AND APPARATUS THEREFOR
Filed Feb. 27, 1962  7 Sheets-Sheet 3

FIG. 3

INVENTOR.
CHARLES R. DAVIDSON JR
BY
Oscar L. Spencer
ATTORNEY

Dec. 14, 1965  C. R. DAVIDSON, JR  3,223,498
HEAT TREATMENT OF CONVEYED GLASS AND APPARATUS THEREFOR
Filed Feb. 27, 1962  7 Sheets-Sheet 4

INVENTOR.
CHARLES R. DAVIDSON JR
BY
Oscar L. Spencer
ATTORNEY

INVENTOR.
CHARLES R. DAVIDSON JR
BY
Oscar L. Spencer
ATTORNEY

Dec. 14, 1965   C. R. DAVIDSON, JR   3,223,498
HEAT TREATMENT OF CONVEYED GLASS AND APPARATUS THEREFOR
Filed Feb. 27, 1962   7 Sheets-Sheet 6

INVENTOR.
CHARLES R. DAVIDSON JR
BY
Oscar L. Spencer
ATTORNEY

Dec. 14, 1965        C. R. DAVIDSON, JR        3,223,498
HEAT TREATMENT OF CONVEYED GLASS AND APPARATUS THEREFOR
Filed Feb. 27, 1962                                7 Sheets-Sheet 7

INVENTOR.
CHARLES R. DAVIDSON JR
BY
Oscar L. Spencer
ATTORNEY

United States Patent Office

3,223,498
Patented Dec. 14, 1965

3,223,498
HEAT TREATMENT OF CONVEYED GLASS AND APPARATUS THEREFOR
Charles R. Davidson, Jr., Natrona Heights, Pa., assignor to Pittsburgh Plate Glass Company, Pittsburgh, Pa., a corporation of Pennsylvania
Filed Feb. 27, 1962, Ser. No. 176,080
10 Claims. (Cl. 65—25)

This invention relates to the fabrication of glass and more particularly to transportation and support of hot glass sheets, at deformation temperature, and particularly to the heating of glass to such a temperature in preparation for other operations, such as tampering, annealing or coating such sheets.

Sheets of glass may be fabricated through known manufacturing techniques of tempering, annealing or coating and combinations of such techniques to form end products having characteristics and uses different from the original product. A common feature of these techniques is the transport of glass sheets from station to station while heating the glass to a temperature above that at which the major surfaces or the contour thereof will be changed by a deforming stress or contact with solids, herein referred to as deformation temperature. For most plate and window glass in a commercial process, this temperature is around 980 degrees Fahrenheit and above (but usually below a temperature of about 1350 degrees Fahrenheit). At this temperature glass sheets, while sufficiently rigid to maintain this identity and transmit a supporting force between spaced points of mechanical support, tend to sag or deform between such spaced points of mechanical support in the magnitude of time during which any part is unsupported.

Economic utilization of fabricating equipment requires that the glass sheets undergoing treatment be conveyed while hot.

The necessity of conveying glass at high temperature has heretofore resulted in undesirable deformation of the major surfaces of glass sheets being treated due to physical contact with supporting and conveying apparatus while the glass is at elevated temperature. The instant invention substantially overcomes this defect common to the known methods of heat treating glass sheets.

Included in the instant invention are new and useful methods and apparatus for supporting and conveying such hot glass.

In the practice of this invention, the hot glass is disposed on rotating or rolling supports such as rolls or balls and moved over more of such supports while the glass is subjected to heat and while a hot gas is introduced between the supports, not only to partially support, but also to heat the glass. The pressure of such gas is held low enough beneath the glass to retain the glass in frictional contact with the supports so that when the support turns or rolls the glass moves, and vice versa.

The rolls or like rolling supports are close enough to take up a substantial portion of the weight of the glass, the distance between the rolls usually being less than 8 inches and in any event rarely over one foot. The rolls bear a substantial portion, i.e., about 5 to 70 percent, of the weight of the glass, since the glass has sufficient rigidity to transmit the weight of the unsupported portions of the glass to the rolls.

More specifically, the methods and apparatus have been devised for conveying and supporting a sheet of glass upon rolls while partially supporting the weight of the glass sheet upon fluid pressure between the rolls during the processing of the sheet, particularly when the glass is at or above deformation temperature but sufficiently rigid that it will transfer from roll to roll without fluid pressure support between rolls. In this manner, the distortion now associated with prior flat glass fabricating processes has been substantially reduced and even eliminated.

In tempering flat sheets, the prior art uses one of three alternative means of support. In one, the glass is gripped near an upper margin by tongs and thus is suspended from a carriage riding on a conveyor which may move the glass from a vertical furnace either laterally or vertically to a position between adjacent blowers which quench or temper the glass. Alternatively, the glass may rest at the bottom edge on a mesh support carried by the conveyor and be held upright by fingers on each side of the upper edge. In a second alternative, flat glass is simply conveyed through a furnace and thence between horizontal blowers with the bottom surface of the glass supported on rolls.

The vertical processes leave tong or finger marks and develop uneven stresses attributable to local heat transfer differentials in the vicinity of the mesh, fingers and tongs.

Conventional roller processes impart a certain degree of surface marking as well as some wave distortion to the sheet because the glass becomes marred and also tends to undulate over the rolls as it softens in its travel.

In the instant invention, glass sheets, for example flat sheets, to be heated to deformation temperature are partially supported upon rotating conveying rolls and partially supported by a gaseous pressure exerted over a major portion of the space between adjacent conveying rolls so as to support the sheets against deformation during the heating. After reaching the desired temperature, each sheet is processed in the desired manner, such as by bending, tempering, etc.

Coated glass has myriad end uses. Many coatings require heat treatment during fabrication. For instance, in producing flat colored spandrels for achitectural purposes, flat glass sheets are coated cold on one side with a frit or enamel and then fired to glaze the frit and bond it to the glass surface. Firing temperatures exceed the deformation temperature of the flat glass substrate. Heretofore, if produced on roller lehrs, wave, bow and other distortion has resulted. If processed while suspended by tongs, tongs marks ensue. Usually the product is chilled after firing to produce a semitemper or partial strengthening.

There is a desideratum for higher temperatures in firing because the durability of the coating is enhanced thereby. The prior art is limited in this regard because above about 1150 degrees Fahrenheit tongs not only indent but more or less tear the glass along the points of contact, while roller systems have previously produced noticeable wave.

The present invention overcomes all these defects, and the coated sheet can be fired at higher temperatures without distortion.

Again, a variety of useful end-products are produced by spraying metallic salt solutions on hot glass. Transparent electroconductive tin oxide coatings are produced when a cold solution of a tin salt, such as tin chloride, is sprayed on hot glass. Transparent light and heat reflecting films are produced when solutions of cobalt and other metal salts are sprayed cold on hot glass. As in the case of enamels, the inadequacies of the prior art limit the temperature of glass sheet treatment below optimum temperatures desirable in achieving not only maximum durability but other functional attributes such as conductivity in conductive films. The glass is distorted in treatment. These deficiencies are overcome in utilizing the present invention.

In accordance with an embodiment of the invention, a substantially uniform gaseous pressure is provided across at least the major portion (50 to 70 percent or more) and preferably across the entire width of a sheet of glass on the under side between spaced rolls which support and convey the glass. The pressure is provided from a plenum below the rolls and is communicated to the supported glass sheet through slots positioned between adjacent rolls, or directly through the spaces between adjacent rolls. The pressure exerted upon the under side of the glass sheet overlying the rolls and in the plenum is insufficient to support the full weight of the glass and hence does not lift the sheet from frictional or propelling contact with the rolls. In operation, the supported glass sheet is partially supported by the fluid under the plenum pressure and partially supported by the rolls themselves.

Advantageously, heating of glass upon the partial gas support is accomplished by burning a controlled mixture of gas and air, introducing the hot products of combustion to the reservoir or plenum which forms the supporting zones, and supplementing the heat thus supplied to the glass by either radiant heat or forced convected heat from an independently controlled source or sources which are generally disposed on the side of the glass opposite the supported side.

The attendant advantages of this invention and the various embodiments thereof will be readily appreciated as the same become better understood by reference to the following detailed description when considered in connection with the accompanying drawings in which.

Figure 1:
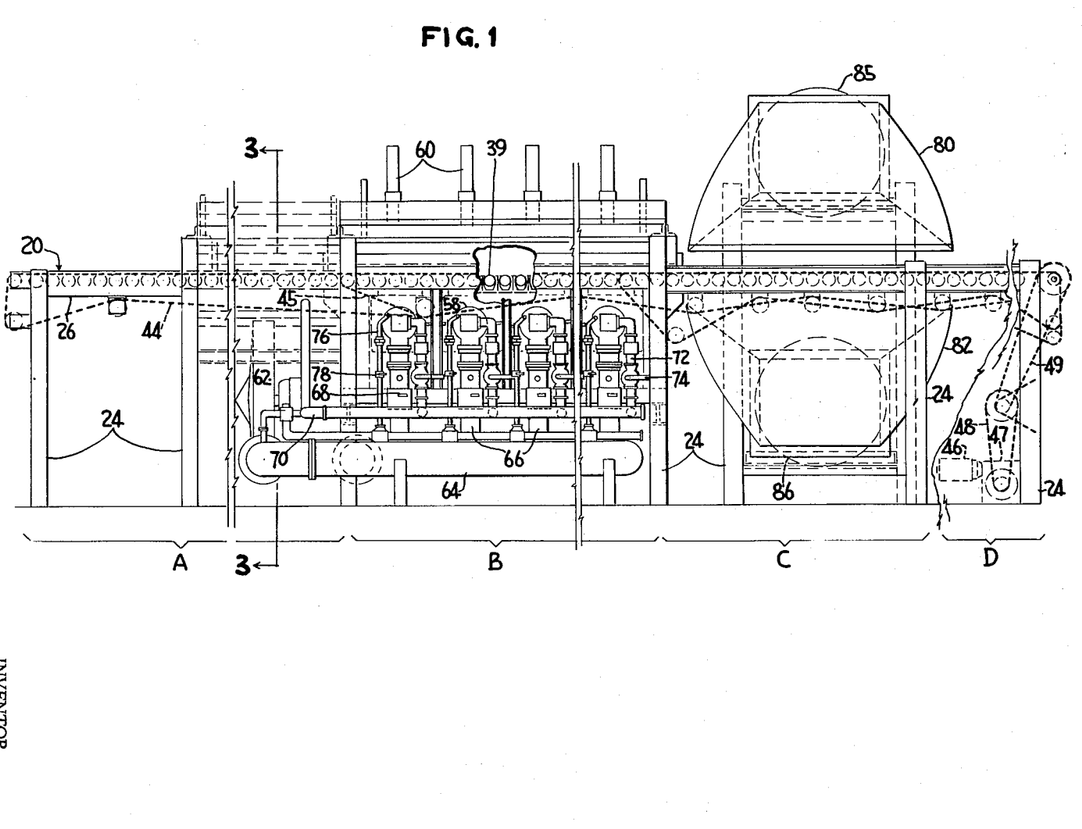
FIG. 1 is a side, elevational view of a system for conveying, heating and quenching sheet glass parts embodying several features of the present invention.

Referring to the drawings, FIG. 1 illustrates a system advantageously employed for heating flat glass parts up to or above the deformation temperature, e.g., to a temperature at which the glass can be tempered, quenching such parts while hot and delivering the parts thus tempered onto a roll conveyor for removal. The component sections making up the complete system consists of a preheat section A, a heating section B, a quench section C and a delivery section D. In section A the glass is conveyed on rollers between radiant heaters to preheat the glass until it reaches a suitable temperature somewhat below the deformation temperature. In heating section B the glass sheets are partially supported and conveyed on rotating rolls and partially supported and heated by hot gas which exerts a fluid pressure upwardly underneath the glass between the rolls, supplemental heat being supplied by radiant heat sources above the glass until the glass reaches a temperature high enough for tempering purposes. In the quenching section C the glass is rapidly chilled while conveyed on rolls between opposing flows of cool air. The delivery roll system D receives the tempered glass parts from the quenching system and conveys them to their next destination.

Associated with preheat section A is an apron roll unit 20 for loading. The essential framework of the apparatus consists of stanchions 24, channel members 26 running the length of the apparatus, and cross beams 28 (see FIG. 3).

*The preheat section*

Figure 3:
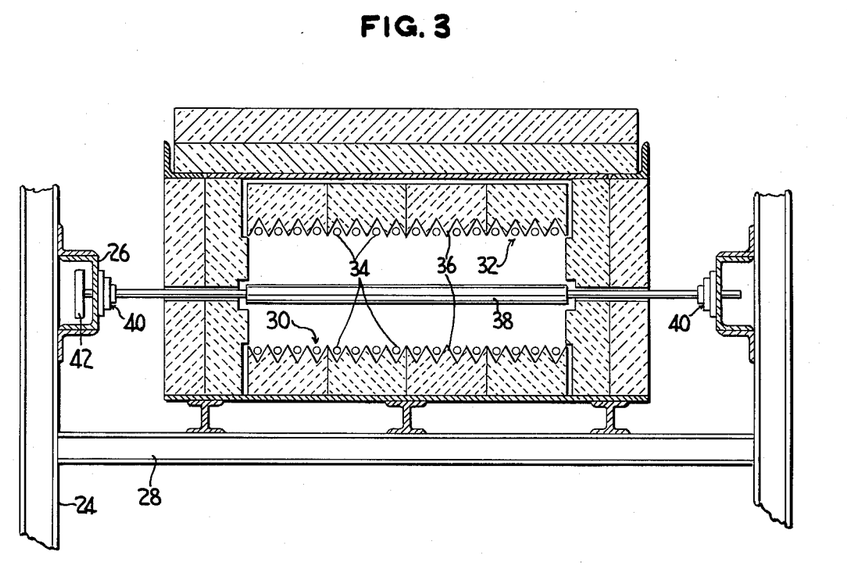
FIG. 3 is a detailed view in section taken along the line 3—3 of FIG. 1.

As illustrated in FIG. 3, the preheat section A includes a radiant floor 30 and a radiant roof 32 built up from individual electrical heating units consisting of heating coils 34 disposed in ceramic holders 36. Control is afforded so that the preheat section may be regulated as to temperature across the path of travel and parallel thereto. Also provided are thermocouples (not shown) to sense the temperature of the preheat section and the glass and to actuate the electrical heating units to the extent necessary to supply the required amount of heat. Horizontally disposed conveyor rolls 38 of relatively small diameter support and convey the glass sheets through the preheat section. Each roll is journaled at each end in bearings 40 supported by channel members 26 and is rotated by attached sprockets 42 through drive chain 44 (see FIG. 1) driven by electric motor 46 through transmission 47 and chain linkages 48 and 49.

*Partial gaseous support heating section*

As shown generally in FIGS. 1, 2, 4 and 5, the heating section B includes within the supporting framework, previously mentioned, radiant roof sections 32 with heating coils 34 susceptible of control by thermocouples (not shown) in increments across and lengthwise of the section.

Conveying rolls 39 (see FIG. 4) of generally larger diameter than rolls 38 for added strength to prevent heat deformation of the rolls at the higher temperatures in the heating section, define a support plane through the heating section which is in horizontal alignment with the support plane of the preheat section. These rolls are relatively close together, rarely being more than 12 inches, usually less than 8 inches apart measured from center to center, i.e., support point to support point. The rolls are driven by attached sprockets 43 (FIG. 5) through a chain 45 (FIG. 1) driven by motor 46 in a similar manner to chain 44 through a transmission linkage which controls the chain speed to rotate rolls 39 at the same peripheral speed as rolls 38.

Figure 4:
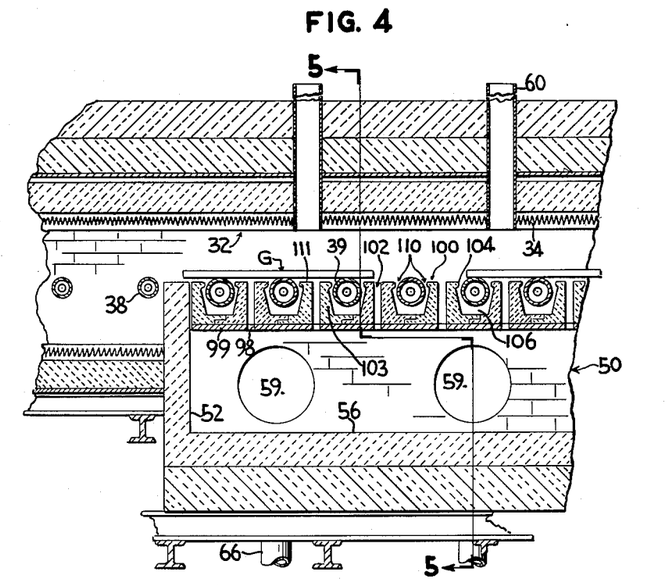
FIG. 4 is a detailed view, partly in section and partly in elevation taken along the line 4—4 of FIG. 2 showing one embodiment of the partial gaseous support heating section.
Figure 5:
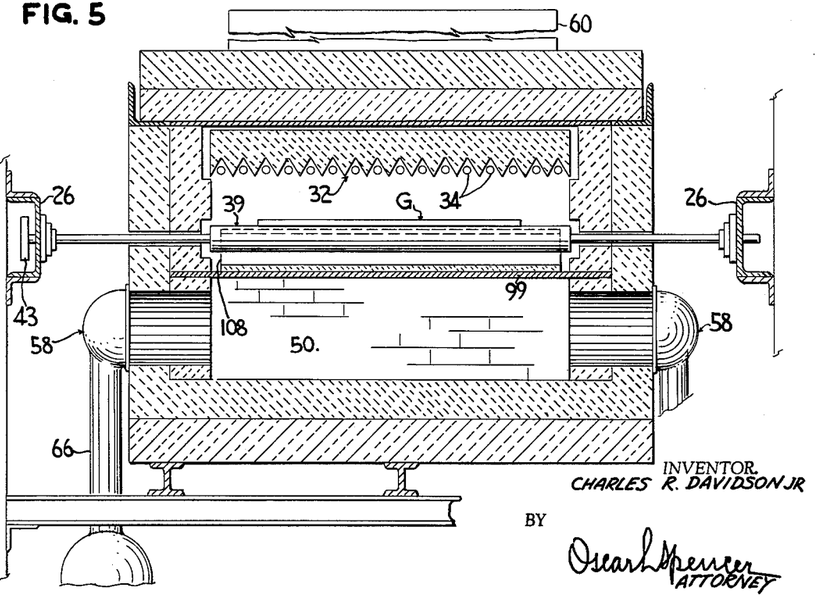
FIG. 5 is a detailed view, partly in section and partly in elevation taken along the line 5—5 of FIG. 4.
Figure 6:
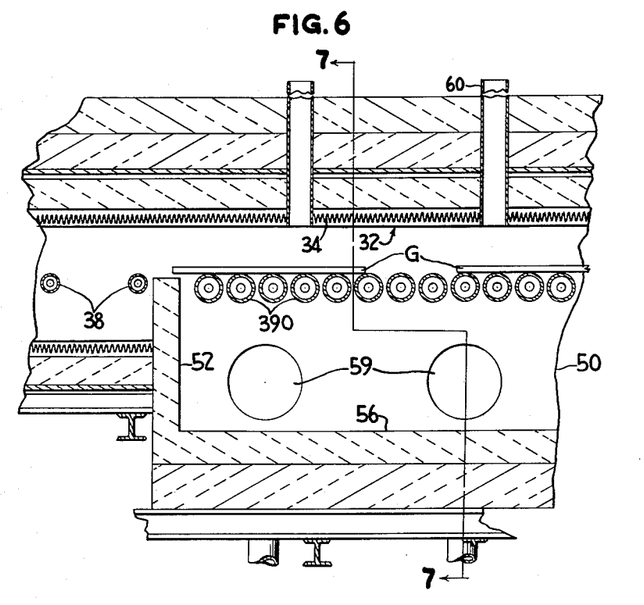
FIG. 6 is a detailed view similar to FIG. 4 but showing a second embodiment of a partial gaseous support heating section.

A plenum chamber 50 (FIG. 5) is disposed beneath the rolls 39 of the heating section being bounded by refractory end walls 52 (one of which is shown in FIGS. 4 and 6), side walls 54, and bottom 56. Spaced gas burners 58 supply hot gas through passageways 59 in each side wall 54 of the plenum chamber 50. A plurality of vents 60 project through the roof of the heating section to exhaust the interior to the atmosphere.

To supply air under pressure to the hot gas support combustion system, one or more blowers 62 (FIGS. 1 and 2) are employed to feed air under pressure through a conduit 63 to a pair of manifolds 64. As best shown in FIG. 1, the individual burners 58 are supplied with air from a manifold 64 through conduits 66, each provided with a valve 68.

Combustible gas from a main 70 is introduced into each burner 58 via conduit 72, each individually valved as at 74.

Each burner 58 is of the socalled excess-air burner type. Combustible gas is mixed with an excess of air within each burner and is ignited by a pilot burner supplied with a premixed supply of combustible through a conduit 76, valved as at 78.

The combustion of the products in the combustion chamber of the burner supplies the plenum chamber 50 with heated gas at a uniform temperature and pressure through passageways 59. Adequate control of pressure and temperature is provided by correlating the rates of input of air and fuel to the burners. To supply enough gas to effect the desired support under normal conditions, an excess of air over that required for the combustion of the fuel gas is used. The supply of gas may be varied to change the heat input, and the supply of both air and gas may be varied to change the pressure in the plenum. Hot fluid from the plenum escapes to areas adjacent the rolls 39 through outlets 102 in a manner which will later be explained in more detail.

Quenching section

Next adjacent the partial gaseous support heating section B in the direction of travel of the workpiece is quenching section C. Separating the two is a suitable baffle (not shown) for the purpose of segregating, as far as possible, the hot environment of heating section B from the cool environment of quenching section C while permitting transfer of the workpieces from the heating section B to quenching section C.

Figure 2:
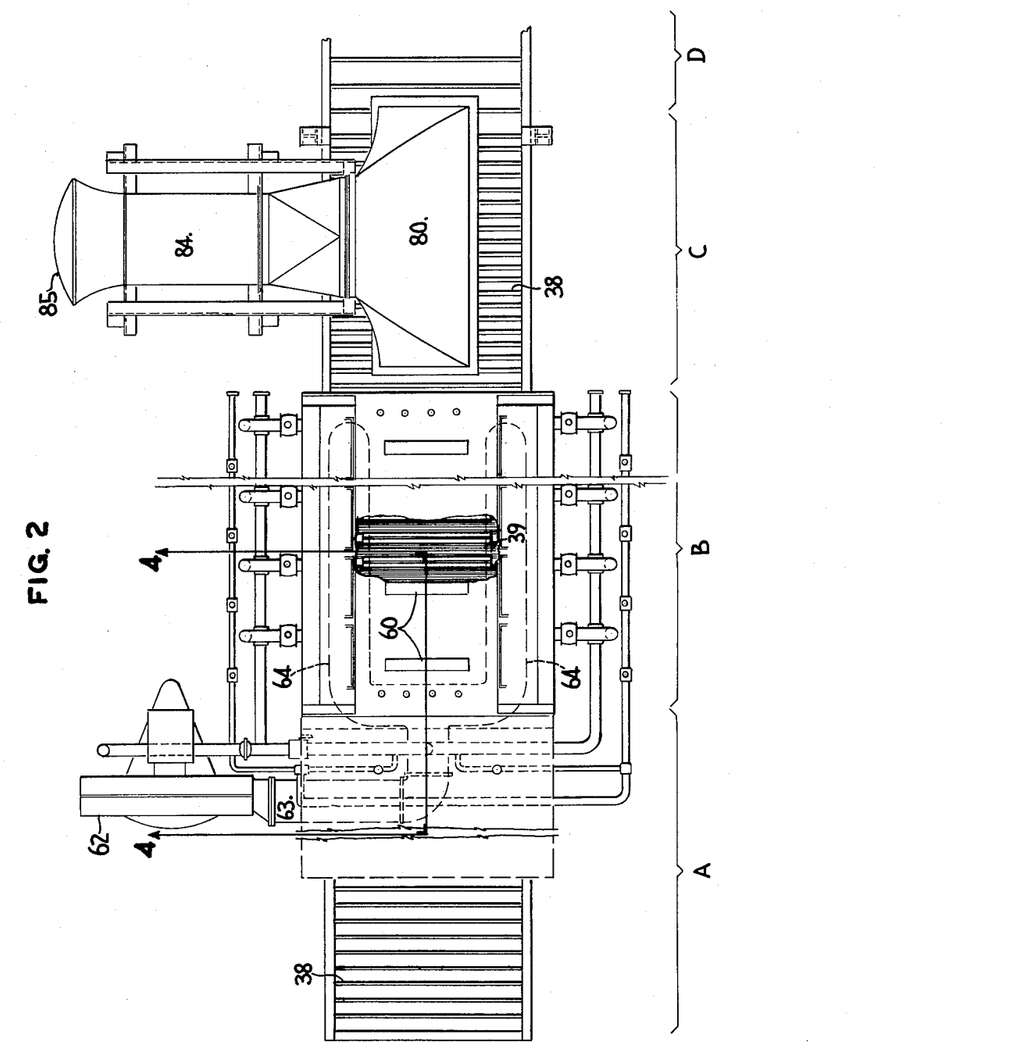
FIG. 2 is a plan view of the system of FIG. 1.

As shown in FIG. 2, the quenching section C includes conveying rolls of smaller diameter than the rolls 39 of the heating sections and of the same construction as the rolls of the preheat section. These rolls are supported at each end by suitable journals fastened to channel members 26 through bearings 40 and are so aligned that their upper peripheries are in a common plane with the upper peripheries of rolls 39 of the heating section. Rolls 38 of the tempering section are driven by chain 44 along with the rolls 38 of the preheat section through suitable linkages from motor 46 at the same peripheral speed as rolls 39.

Chambers 80 and 82, respectively, are spaced above and below the plane of support defined by rolls 38 and have slotted openings (not shown) disposed in spaced, vertically aligned, horizontal planes and oriented transversely of the direction of glass travel. These slots extend across the entire width of the support plane in which the moving glass sheet will be disposed. Conduits 85 and 86, respectively, supply chambers 80 and 82 with air from independent blowers, one of which is indicated generally at 84 (FIG. 2), housed within the intake portion of the conduits. This air is supplied at a suitable rate of flow and pressure to quench the glass sheet.

Delivery section

As shown in FIGS. 1 and 2, the delivery roll section D consists of conveyor rolls 38 of the same construction as those of the quenching section C but generally spaced somewhat farther apart. Each roll is suitably journaled in bearings and supported by channel members 26 so as to form a supporting plane in horizontal alignment with the supporting plane of the quenching section C. These rolls are driven from the transmission means for the quenching section C.

Plenum design

In accordance with this invention, supporting apparatus has been provided which affords partial support for those portions of a glass sheet conveyed on rolls which lie between lines of mechanical support. To provide substantial uniformity of support below the glass across the width of the conveying path, a fluid pressure is supplied to this area from a common plenum chamber which communicates with the zones beneath the glass between the supporting rolls. The average pressure exerted by the fluid on the glass is maintained below that which would lift the glass from the rolls.

In the embodiment shown in FIGS. 4 and 5, rolls 39 provide a plane of support for the glass sheets G and are spaced from each other a sufficient distance to provide space for channel shaped members 100 having upper flanges 104, the outer and uppermost surfaces of which form a support bed slightly below the plane of support defined by the upper peripheries of the rolls 39. Two channel members 100 are positioned between each pair of adjacent rolls and oriented with their vertical web portions 103 in back-to-back relationship but spaced to provide a vertical slot 102 across the width of the conveying path. The channel members are supported on plenum chamber cover plate 99 which has slots 98 extending across the width of the conveying path to communicate the plenum pressure with slots 102 and hence with the zones immediately beneath the glass sheet G. Channel members 100 are formed of a suitable refractory material such as a ceramic and are secured in position on cover plate 99 by suitable fastening means (not shown). Alternatively, channel members 100 may be cast as a single ceramic insert having a cast-in slot, the adjacent members joining under each roll. Ceramic edges formed in the side walls of the plenum chamber may then support the inserts, eliminating the need for a cover plate. Preferably the ends of the slots will be closed to minimize the escape of gas.

Upper flanges 104 of each pair of channel members 100 which form a slot 102 extend in opposite directions away from the slot. The distal end of each upper flange is proximate to the periphery of the roll 39 which is located on a corresponding side of slot 102. In this manner, a chamber 106 having open ends 108 (see FIG. 5) and entrance slots 110 on each side of rolls 39 extends across the width of the conveying path and provides an escape conduit for the gas emitted from slots 102 beneath the supported glass sheet. The size of slots 110 relative to the size of slots 102, the relatively large volume of chambers 106, and the pressure differential between plenum chamber 50 and the ambient atmosphere within the lehr at openings 108 determine the rate of gas flow and pressure buildup beneath a supported sheet G. In operation, the total area of slots 110 (measured horizontally at the top thereof) is greater than the area of slots 102 (measured at the same level) to provide adequate exhaust. The pressure in plenum 50 is sufficiently greater than the pressure at openings 108 of chambers 106 that a positive pressure is created beneath the supported sheet and between adjacent rolls to support a portion of the weight of the glass sheet.

The upper extremities of the channel members terminate somewhat below the upper extremities of the rolls, thereby providing narrow paths or conduits 111 for transferring gas impinging against the glass from slot 102 to the exhaust slots 110. This achieves especially advantageous transfer of heat between the gas and the glass while yet providing wide area of support for the glass between the rolls. To facilitate this support, the space 111 is shallow, rarely being more than 0.75 nor less than 0.05 inch, preferably not being over about 0.40 inch.

In the operation of the device a reservoir of hot gas under a small pressure of about 1 to 3, or more, inches of water is established in the plenum chamber by burning fuel gas and feeding the hot combustion gases into the plenum chamber. Enough diluent gas (excess air or the like) is fed in simultaneously or along with the combustion gases to reduce the temperature a satisfactory degree, usually to about 1100 to 1500 degrees Fahrenheit, and in any event to below about 2000 degrees Fahrenheit. The hot gas flows into the slots 102 and over the upper edges thereof and impinges directly against the glass at a velocity low enough so that the impinging gas does not "dimple" or otherwise mark the glass. This creates an unusually effective transfer of heat from the gas to the glass and also develops a peak pressure.

The gas then passes over the edges through the channel 111 to the exhaust slots 110 where it flows out of the system in contact with the rolls.

Meanwhile the glass is heated radiantly by the radiant heat source above the opposite (upper) side of the glass. Since the temperature of the radiant source preferably is somewhat higher (usually 10 to 50 degrees Fahrenheit or more) than that of the glass, there exists some tendency to overheat the rolls. However, this tendency is overcome since the exhausting gas contacts the rolls thus holding them substantially at the gas temperature.

Because of the close proximity of the upper edges of the slots 102 and the tops of the flanges 104 to the glass, the coefficient of heat transfer is unusually high, permitting vary rapid transfer of heat between the gas and the glass even though there exists but a narrow difference between the glass temperature and gas temperature near the end of the heating process. These high coefficients are obtained when the edges are close to the glass, for example, less than 0.75 inch and preferably less than about 0.40 inch, therefrom.

While wider spacing can be resorted to for partially supporting the glass, the heat transfer coefficients tend to fall off substantially, thus requiring a more rapid flow of hot gas in order to achieve heating at a rapid rate. Although some increased rate of gas flow can be tolerated, it creates other problems such as impairment of the glass surface. Hence, the close spacing described above insures more advantageous performance.

In the embodiment discussed above, the exhausting gas passes into contact with the rolls. This tends to stabilize the temperature of the rolls holding that temperature low enough so that they do not mark the glass by localized overheating.

It will be understood that the heat can be transferred to the rolls by the hot support gas and also by the radiation from the heat source above the glass. Where the temperature of that source is higher than the gas, the rolls can reach or approximate in temperature that of the source. This temperature often is too high and causes marring of the glass. By passing the lower temperature support gas into contact with the rolls this overheating may be avoided.

If the temperature of the gas is high, other means for holding the rolls to a temperature below about 1350 degrees Fahrenheit (such as by internally cooling the rolls with air or water) may be resorted to.

The quantity of heat transferred to the glass by the heated supporting gas is maintained large by the continuous flow of gas from plenum chamber 50. The direction of the gas flow, by virtue of the location of exhaust zones within the path of glass travel, is transverse to the axis of rotation of the rolls (i.e., in the direction of movement of the sheet), thus preventing a substantial pressure buildup at the center of the sheet and hence preventing a substantial pressure differential between the center and periphery of the glass sheets with the accompanying progressive flow laterally of the path of travel to exhaust at the edges of the sheet. By providing exhaust zones in the path of travel and assuring a substantially uniform flow across the entire width of the glass, more uniform heating and a more uniform support pressure profile are obtained.

Figure 7:
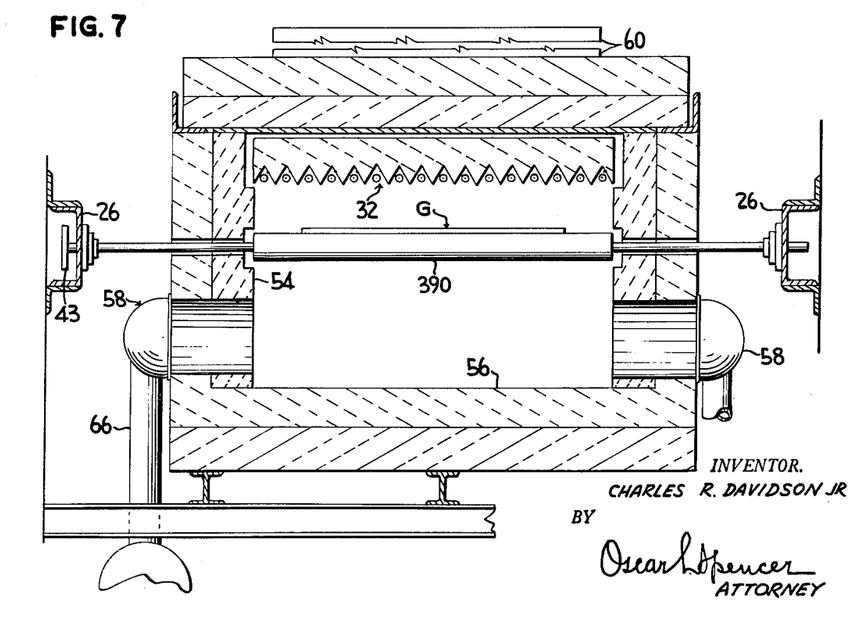
FIG. 7 is a detailed view, partly in section and partly in elevation taken along the line 7—7 of FIG. 6.

In the embodiment shown in FIGS. 6 and 7, large diameter conveying rolls 390, having their adjacent peripheries closely spaced, provide a "cover" for plenum chamber 50 and by virtue of their proximity to each other minimize the area through which gas may escape between uncovered portions of the rolls. At the same time, the spaces between the rolls provide passageways adequate to communicate the plenum pressure to the unsupported areas beneath the glass sheet. In this embodiment a substantially uniform and static pressure is produced centrally of a supported glass sheet. However, considerable gas flow occurs adjacent the periphery of the sheet because of the escape paths between the portions of the rolls that are uncovered. This results in an increased rate of heat transfer around the edges of the glass sheets and necessitates a slightly longer heating cycle to assure uniformity of temperature throughout the glass sheet prior to the subsequent processing steps. Depending upon the temperature of the gas, the rolls may reach a sufficiently elevated temperature to reradiate substantial heat to the glass and help achieve a uniform temperature across the supported sheets.

Figure 8:
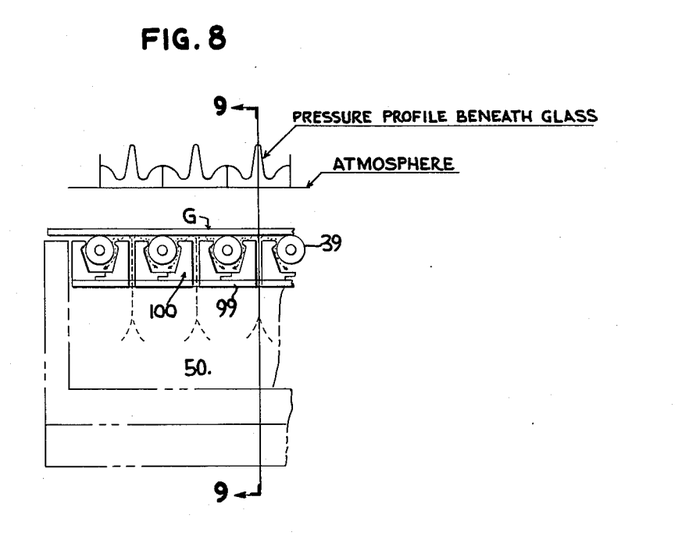
FIG. 8 is a schematic view of a section of the partial support plenum chamber showing diagrammatically the flow and exhaust of the support gases and presenting a diagrammatic graph in conjunction therewith.
Figure 9:
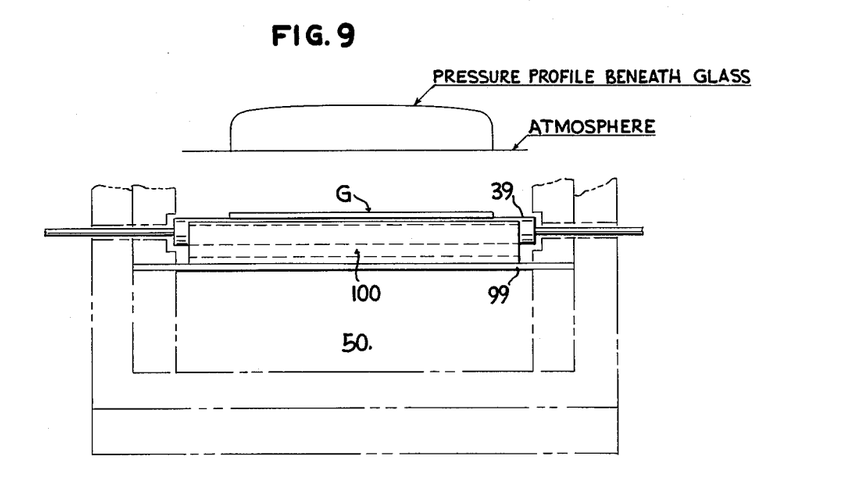
FIG. 9 is a schematic view taken along line 9—9 of FIG. 8 and presenting a diagrammatic graph in conjunction therewith.
Figure 10:
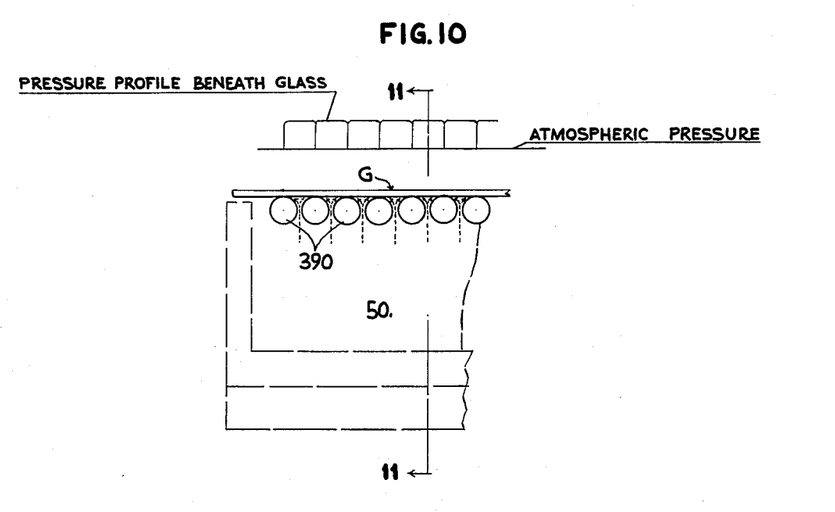
FIG. 10 is a schematic view similar to FIG. 8 but showing a second embodiment of a partial support plenum and presenting a diagrammatic graph therewith.

Typical pressure profiles at the supported surface of the glass in the above embodiments are shown schematically in FIGS. 8 to 10.

The curve of FIG. 8 schematically illustrates the pressure profile of the embodiment of FIG. 4. Because of the proximity of slots 102 to the supported glass surfaces, and because there is a flow of gas from each slot toward the adjacent rolls, a higher pressure is noticed directly above each slot. This is caused by the impact pressure of the gas flowing through the slots and impinging upon the glass sheet, and by the necessarily lower pressure which must be maintained at slots 110. Due to the expansion of the gas beneath the glass sheet and the restriction to flow created by the exhaust slots 110, a static pressure component of the total gas pressure is noticed adjacent the rolls. This is shown in FIG. 8. Because the glass sheet is partially supported by the rolls, there is theoretically no fluid pressure exerted on the glass at the points of contact. The pressure profile, however, is observed to be essentially continuous. Movement of the glass across the pressure variations between each pair of adjacent rolls averages the effect of the variations and hence diminishes their effect upon the glass.

FIG. 9 shows that the pressure profile across the width of the conveying path is substantially uniform. Uniformity is primarily due to the existence of exhaust slots 110 which allow a substantially uniform flow of gas across the width of the conveying path and greatly diminishes (although perhaps not completely eliminating) the flow laterally of the path. Lateral flow is the result of a progressive pressure drop from the center to the lateral edges of the conveying path, causes a domed pressure profile, and results in unequal heat transfer.

The curve of FIG. 10 shows that the pressure exerted upon the lower surface of a glass sheet overlying the rolls in the embodiment of FIG. 6 is substantially constant between points of contact of the glass with adjacent rolls. There is very little gas flow, the glass sheet functioning essentially as the top of the plenum.

Figure 11:
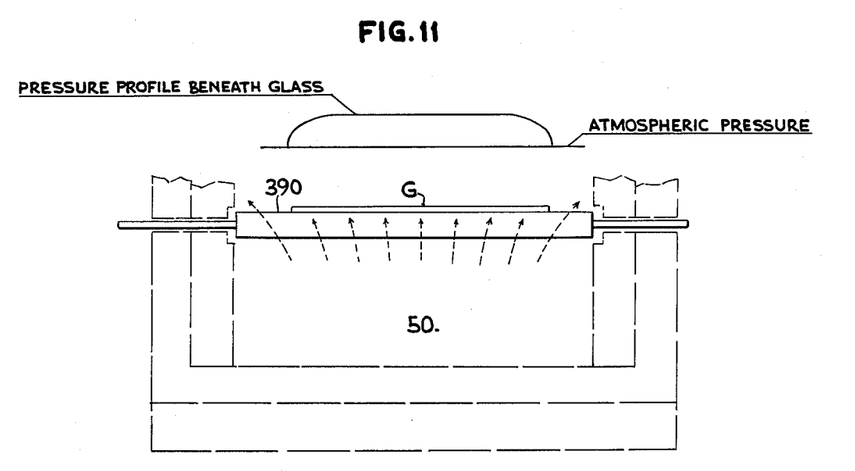
FIG. 11 is a schematic view taken along line 11—11 of FIG. 10 and presenting a diagrammatic graph therewith.

FIG. 11 diagrammatically shows the pressure profile beneath a supported sheet of glass along a path parallel to and between adjacent conveying rolls in the embodiment of FIG. 6. The pressure is substantially uniform across the central portion of the glass sheet, a slight doming being noticeable. The pressure rapidly diminishes at the side edges of the sheet where the gas escapes by lateral flow through the area between the roll peripheries and the supported sheet.

Pressure profiles in the plane of support formed by the conveying rolls above the plenum chamber may be determined in the following manner: A pressure sensing plate having a small hole therethrough is positioned upon the conveying rolls. A pressure transducer is connected to the sensing hole and the electrical output of the pressure transducer is connected to a recorder which will graph pressure variations on one axis and displacement of the pressure sensing plate on the other axis. The pressure transducer controls the displacement of the recording device along, e.g., the Y axis of the graph. A potentiometer, the shaft of which is rotated by horizontal movement of the sensing plate relative to the conveying rolls, translates such movement to an electrical signal which controls the displacement of the recording device along the other, or X axis, of the graph.

*Operation*

The following are examples, by way of illustration only, of preferred modes of operation of the invention disclosed herein as applied to the treatment of glass sheets.

A. TEMPERING

Sheets of glass one-quarter inch nominal thickness and approximately 16 inches wide by 28 inches long are placed lengthwise seriatim upon the apron roll unit 20 and conveyed on rolls into and through preheat section A at a line speed of 100 inches per minute. In this manner an average of about 150 pieces of glass per hour are conveyed through the system. Electric heating coils 34 above and below the moving glass supply heat to the preheat section to raise the temperature of the glass to approximately 950 degrees Fahrenheit surface temperature in approximately 1½ minutes.

As the leading edge of the glass sheet leaves the last roll of the preheat section and progressively covers succeeding rolls of the heating section, the sheet becomes partially supported by the pressure of the gas in plenum 50. A sufficient portion of the weight of the glass remains supported by rolls to provide the frictional force necessary to convey the glass sheets by rotation of the rolls.

Gas burners 58 are supplied natural gas and air in proportions by volume of approximately one to forty, respectively, which includes 300 percent excess air over that required to provide complete combustion. The natural gas is provided at a rate of approximately 0.9 cubic foot per minute per foot of slot length, the slots being ⅛ inch wide. The products of combustion are introduced to the plenum producing therein a plenum pressure of approximately 0.1 pound per square inch gauge and a pressure upon the glass sheets overlying the plenum of approximately 0.02 pound per square inch gauge. The temperature of the gas within the plenum is approximately 1250 degrees Fahrenheit and the volume flow, at standard temperature and pressure, averages approximately 36 cubic feet per minute per foot of slot length.

The conveyor rolls in the heating section of this example are constructed of stainless steel seamless pipe, are 51 inches long, 2.8 inches in diameter, and are located on 4¼-inch centers. Between each pair of rolls ceramic channel members 100 form gas inlet passages ⅛ inch in width and 18 inches long. Upper flange members 102 of the channels provide a substantially flat surface ⅜₆ inch below the support plane defined by the upper peripheries of the rolls 39. The distal ends of each upper flange member 102 provide slots ⅛ inch wide adjacent each roll.

Heat is added to the glass plates convectively from the gas which flows from the plenum and radiantly from roof heating coils 34 at a temperature of about 1250 degrees Fahrenheit. In addition, the ceramic channels and the conveying rolls become heated from the gas within the plenum and become a secondary radiating source supplying heat to the glass. As glass is fed into the furnace, the radiant heaters above the glass are actuated to supply the fluctuations in heat demand. In this manner the temperature of the glass is raised to approximately 1200 degrees Fahrenheit by the time it completes its travel through the heating section. Because it is desirable to apply heat equally to the top and bottom of the glass sheets to reduce bowing or other warpage of the glass, the gas is supplied at approximately the temperature to which the glass is to be finally heated. The radiant heat energy level (e.g., temperature) above the glass is then adjusted to balance the heat from below to keep the glass sheets flat. For example, glass bowed convexly upward in the early heating zones or in the quench zone frequently indicates excessive radiant heat from above. The speed at which the glass is conveyed through the heating section is then controlled to obtain proper heat input per glass unit and hence the proper temperature for tempering in the subsequent quenching section.

In the quenching section, air at an ambient temperature of approximately 100 degrees Fahrenheit is supplied to each of the two air chambers 80 and 82 of the tempering section at a pressure of approximately 2 ounces per square inch and is emitted through quarter inch slots thereof adjacent the plane of support of the glass sheets at a rate of about 140 cubic feet per minute per foot of slot length. The temperature of the glass is lowered in this manner to an approximate 600 degrees Fahrenheit by the time it leaves the quenching section and at this point is no longer deformable.

B. COATING

The present invention is especially valuable when applied to the provision of deformable or visco-elastic materials with coatings which must be cured, produced or developed at a temperature at which the base is subject to deformation or warping. Often the durability of an enamel coating on glass can be improved by heating the enamel at a deformation temperature for the glass base. However, since such a high temperature would warp the glass, this improvement in durability cannot be achieved in usual processes. By supporting and heating the glass coated with enamel frit on the rolls and partial gas support herein disclosed, the frit can be fused at higher temperatures without the deformation previously encountered.

In a typical embodiment, glass sheets are sprayed with the following composition:

| | | |
|---|---|---|
| Bentonite | g | 1.2 |
| Cryolite | g | 0.8 |
| Boric acid | g | 0.3 |
| Methanol | cc | 10.0 |
| n-Propanol | cc | 15.0 |
| Water | cc | 75.0 |
| Sodium pyrophosphate | g | 0.1 |
| Aluminum powder (Alcoa No. 322) | g | 10.0 |

The glass thus coated is fed through the preheating and heating sections herein disclosed, the temperature of the supporting gas within the plenum being 1120 degrees Fahrenheit, and the temperature of the radiant heat source being 1200 degrees Fahrenheit. The glass sheet is held at this temperature until the metal coating has binded itself to the base. Thereafter it is withdrawn from the heating section and cooled.

Other transparent, or light reflecting, or opaque films of known compositions may be applied and cured in the same way. Furthermore, glass sheets may be heated in the heating section as hereinbefore described to a temperature of about 1100–1250 degrees Fahrenheit and sprayed with stannic chloride or an aqueous solution thereof, while the glass is partially supported by fluid pressure in the manner previously explained, thus producing a transparent electroconductive tin oxide coating on the glass.

*Other embodiments*

While the operating examples disclosed above illustrate embodiments of this invention, in many instances it is possible to alter these values or constituents or substitute equivalents therefor to obtain substantially the same results in substantially the same way.

For example, the flow of the support gas may be reversed, i.e., the inlet slots may be placed adjacent the rolls and the exhaust slot in a central area between the rolls. Other arrangements for providing a fluid pressure beneath the supported glass sheet and between adjacent rolls may be used, such as spacing the rolls a greater distance and providing two or more slots for supplying and exhausting gas in the space between rolls or by spacing the slots a greater distance from the glass. While for best results the fluid pressure should extend across the entire width of the glass sheet, substantial improvement in quality is obtained where the support is provided beneath only 50 to 70 percent of the width.

Porous platens may be provided between adjacent rolls instead of structurally defined slots to supply gas, an exhaust channel in the path of travel being provided around each roll.

Individual manifolds may supply the gas to each zone between adjacent rolls and each may be supplied independently or all may be supplied from a common reservoir.

It is not intended that the plane of support provided for the glass by the rolls and the gaseous pressure be necessarily horizontally disposed. Rather, the support bed may be tilted at an angle between the horizontal and the vertical. Preferably a collar will be provided on each roll, each in proper alignment with the other, to support the lower edges of the glass sheets.

For most satisfactory results, while maintaining frictional contact between the rolls and the supported glass sheet, the fluid pressure exerted upon the sheet between the rolls should support between about 30 to 95 percent of the total weight of the glass, the rolls thus taking about 5 to 70 percent of such weight.

Improved heating of glass sheets may be obtained without utilizing the partial support afforded by the fluid pressure in the preferred embodiments of the present invention. Thus, glass sheets may be heated in the manner disclosed herein without regard to the support characteristics, as where other factors, such as the speed at which the glass is conveyed, the spacing of rolls, and the temperature to which the glass is heated, have already minimized the chance of deformation. Greater utilization of the heating aspects of this invention may be obtained by the use of gas inlets and exhaust spaces similar to those of the support beds, but independent of the rolls, and located above the glass so as to convectively heat the unsupported surface of the glass as well as the supported surface.

The speed at which the glass is conveyed through the heating section may be varied to suit production requirements, as long as sufficient time is provided for the glass to attain the desired temperature. However, because the extent to which nonuniformly supported glass at a deformation temperature deforms depends in part on the time during which any one portion is subject to such variation in supporting force, best results are obtained when a relatively high conveying speed, consistent with other handling factors, is maintained. This is particularly true where high furnace temperatures are used.

It is contemplated that hot air or other gases having different coefficients of heat conductivity from the products of combustion used in the above examples and heated in a manner different from that disclosed herein may be utilized to provide partial support. The desired gas support pressure will, of course, vary with the glass thickness being supported. The gas flow will vary with the pressure desired, the amount of escape area between adjacent uncovered rolls, and the quantity of heat to be transferred convectively.

It should be evident from the above that, while in the foregoing disclosure certain preferred embodiments of the invention have been disclosed, numerous modifications or alterations may be made therein without departing from the spirit and scope of the invention as set forth in the appended claims.

I claim:
1. In a method of supporting and conveying a glass sheet, the improvement which comprises:
   (a) disposing the glass upon a portion of a plurality of laterally spaced rolling supports having discrete spaces therebetween, which supports define a longitudinally extending path of movement of said glass,
   (b) supplying gas in said discrete spaces at a pressure sufficient to partially support the glass,
   (c) heating said glass at a deformation temperature while so supported,
   (d) moving said glass in said path as said rolling supports thereunder rotate,
   (e) maintaining the gaseous pressure in said discrete spaces
      (1) high enough to partially support the glass during its movement thereover but
      (2) low enough to support the glass in frictional contact with the rolling supports with which the glass is engaged, and
   (f) maintaining the glass at deformation temperature while it is so supported.

2. The process of claim 1 wherein the glass is moved over the path including the rolling supports by positively rotating rolling supports in frictional contact with the glass.

3. The process of claim 1 wherein the glass is maintained rigid enough so that a substantial portion of the weight of the glass is supported by the rolling supports and the glass is heated from a lower temperature to a deformation temperature while it is supported on said path.

4. The process of claim 2 wherein the temperature of said rolling supports is maintained below 1350° F.

5. The process of claim 1 wherein hot gas at a deformation temperature is impinged against the glass sheet in said discrete spaces and then is flowed along the under surface of the sheet and applies support pressure to the sheet both during said impingement and while flowing along said surface.

6. The process of claim 5 wherein the hot gas impinges against the glass in an area between the rolling supports, flows along the sheet, then contacts the roll and then exits from between the rolls.

7. The process of claim 1 wherein at least about 30 percent but not more than 95 percent of the weight of the glass sheet is supported by the gas.

8. The process of claim 1 wherein the rolling supports support 5 to 70 percent of the weight of the glass.

9. Apparatus for supporting and conveying a heat deformable sheet which comprises:
   (a) a plurality of spaced conveying rolls defining a path, the tops of said rolls defining a support level;
   (b) at least one heat resistant member between a pair of adjacent conveying rolls and disposed below said support level, the heat resistant member having an upper surface disposed a short distance below said support level providing a passageway for hot gas along said support level in the direction of said path;
   (c) means to supply hot gas at one end of the passageway in a direction toward said support level;
   (d) means to exhaust gas from the other end of said passageway; and
   (e) means to restrain the exhaust of said gas whereby when the sheet is disposed on the conveying rolls the hot gas flows along each said passageway under said sheet to apply a support pressure to the underside thereof.

10. The apparatus of claim 9 wherein said means to supply hot gas is directed toward said support level whereby the hot gas impinges against a sheet when supported on the rolls, applying an initial support pressure, and then flows along said passageway.

References Cited by the Examiner

UNITED STATES PATENTS

| 756,600 | 4/1904 | Dodge | 198—108 |
| 820,205 | 5/1906 | Keighley | 65—176 |
| 1,622,817 | 3/1927 | Waldron | 65—182 X |
| 2,042,610 | 6/1936 | Littleton | 65—114 |
| 2,505,103 | 4/1950 | Devol | 65—25 |
| 2,848,820 | 8/1958 | Wallin et al. | 34—23 |
| 3,062,520 | 11/1962 | Frey et al. | 65—182 X |

FOREIGN PATENTS 356,676  1931  Great Britain (voided application).

DONALL H. SYLVESTER, *Primary Examiner.*